No. 728,851. Patented May 26, 1903.

UNITED STATES PATENT OFFICE.

WILLIAM R. BRIXEY, OF SEYMOUR, CONNECTICUT.

VULCANIZED KERITE COMPOUND.

SPECIFICATION forming part of Letters Patent No. 728,851, dated May 26, 1903.

Application filed March 20, 1903. Serial No. 148,692. (No specimens.)

*To all whom it may concern:*

Be it known that I, WILLIAM R. BRIXEY, of Seymour, in the county of New Haven and State of Connecticut, have made certain new and useful Improvements in the Vulcanized Compounds Known as "Crude Kerite" and "Kerite," the latter being the finished product in which the crude kerite is employed to impart to it its special qualities; and I hereby declare that the following is a full, clear, concise, and exact description of my said improvements and of the manner in which they may be manufactured for practical use.

This invention relates to the kerite compositions which are described in the Letters Patent of the United States, Nos. 714,858 and 714,859, granted to me on the 2d of December, 1902. These Letters Patent set forth, respectively, the practical methods of making my new products, and this present specification is intended to cover and claim the products themselves.

Crude kerite is the basic component of a compound which when it is made complete by the combination with it of natural india-rubber at a vulcanizing heat forms the material known as "kerite." This material constitutes an insulator of recognized superiority and durability for electric wires and cables and all other electrical uses, the india-rubber furnishing the insulating property and the crude kerite imparting the necessary permanency and the capacity to resist deteriorating influences. In its composition previous to my improvements crude kerite was a mixture consisting, essentially, of cotton-seed oil, linseed-oil, coal-tar, bitumen, asphalt, and sulfur, the latter being employed partly in its ordinary form and partly in the form of sulfid of antimony and the combined ingredients being subjected to high temperatures for the requisite heating periods to thoroughly incorporate them into a homogeneous body and vulcanize the mass.

Both crude kerite and kerite were originally invented and introduced into use by the late Austin G. Day. He gave them these names, and many Letters Patent of the United States were granted to him from time to time for his inventions in relation to them. In his manufacture and use of each of the products he met with much success, and his best practice and results were always obtained with substantially the above-stated compound of cotton-seed oil, linseed-oil, coal-tar, bitumen, asphalt, and sulfur heated and vulcanized as set forth. I became the owner of his patents, and by long-continued manufacture of his kerite products and close study of the nature of the elements which enter into them I have discovered that by reconstituting the crude-kerite mixture as made by him and altering it by omitting some of the ingredients of it, adding another one, and changing the temperature and length of several of his heating periods I can produce a crude compound which when combined with the india-rubber to form the finished kerite will give a product that not only far surpasses the Day kerite in electrical resistance, but also can be manufactured at very much less cost.

To enable those skilled in the arts to which my invention most nearly appertains to put it into use, I will now describe in detail the manner in which I manufacture my improved compounds, beginning first with the process of making the new crude kerite.

For an ordinary working batch of the crude kerite—say about one hundred and eighty pounds in all—I generally first take twenty-five pounds of coal-tar and fifteen pounds of asphalt, put them together in a kettle or other suitable boiler or vessel, and heat them up to 350° Fahrenheit for one and a half hours. I next add seventy pounds of linseed-oil to the mixture and again heat the whole to 350° for seven hours. At this stage of the working the three ingredients are well prepared to be united into a homogeneous mass, and I then let the mixture stand overnight to allow this union to take place. In the morning they will be found to be thoroughly combined, and I then once more heat the mass up to 240°, and as soon as it reaches this temperature I add to it ten pounds of sulfur, the latter being in its ordinary form and not in the form of a sulfid, and continue the heat at an increased temperature—say about 320°—for about half an hour. At the end of this time I add four pounds more sulfur and run the heat up until the temperature reaches 300°, or thereabout, and then put in about fifty-six pounds of talc and keep the heat up at about the same temperature until vulcanization of the entire mass takes place, which will usually be in about one-half to three-quarters of an hour after the talc is added. The batch is now completed and is ready to be poured into molds to cool, or it may be kept in bulk to be mixed with the natural india-rubber to form the finished kerite product.

From this statement of my process of making my new crude kerite it will be seen that I use no sulfid of antimony or other sulfid and no cotton-seed oil. The omission of the cotton-seed oil is the new feature and the controlling characteristic of my invention, and it is by reason of my leaving this oil out of the crude compound as the latter was made by Day, together with the consequent changes in some of his heating periods, that I am enabled to obtain a crude-kerite product which imparts to the finished kerite the very striking superiority herein set forth.

In order to exhibit the differences between my improved method of making the crude compound and Day's mode of working, it may be well to compare my process stage by stage with that described in the last Day patents, which were those issued in 1885. Day began his treatment by mixing together, for his first step, coal-tar or bitumen and cotton-seed oil. For the first stage of my process I omit the cotton-seed oil entirely and mix only coal-tar and asphalt, without any oil whatever. Day also used a heating period of three to five hours for his first step. I employ only one and one-half hours for my first mixing. He then, for his second step, added linseed-oil and for his best results allowed the preliminary mixture of coal-tar or bitumen and cotton-seed oil to stand overnight to cool before putting the linseed-oil in. For my second step I add linseed-oil to my mixture of coal-tar and asphalt and let the combination of the three stand overnight. For his third and last step he added sulfur and an amount of sulfid of antimony equal to the sulfur used and heated the mixture for three to five hours or longer. In his actual practice the heat was continued for seven hours. For my third step I add sulfur in its ordinary form, but no sulfid, and heat the mass only half an hour. At the end of that time, for a fourth step, I add more sulfur, and then finally, for a fifth and finishing step, I introduce a considerable quantity of talc, which is an entirely new ingredient in a crude-kerite compound. The talc is obviously not in any sense an equivalent for any of the materials omitted from the Day process, and I have found that it very substantially increases the value of the product. I am aware that the differences disclosed by this comparison of the processes may not at first appear material or important unless attention be paid to the very significant differences in the results which the processes produce and to the consequent great improvement shown by my new crude compound. This improvement is manifested, first, in a realized capacity of electrical resistance at least twice as great as that of the former kerite, and, second, in a reduction of not less than forty per cent. in the manufacturing cost of the product. These facts necessarily establish substantial differences in the method of production. At the same time all the valuable properties of the former compound remain unimpaired in my kerite. It possesses the same high capacity to resist the deteriorating influences of the atmosphere, and whether it be employed above or under the ground or beneath the sea it is equally impervious to all the destructive agencies of earth, air, and water, while in respect of the gradual improvement in insulation which kerite exhibits, as is well known by continued use, my product is greatly in advance of the Day compound. The reason of this superiority of my improved kerite is this: Although india-rubber is by itself one of the best insulators known, it possesses no durability for electrical purposes and cannot be used alone. It is therefore necessary to combine the crude kerite with it to give it permanence; but I have discovered that when a crude kerite which contains cotton-seed oil is united with rubber the presence of this oil in the product impairs and lowers to a very great degree the insulating capacity of the rubber, and I have found that by my process of making the crude kerite without the use of cotton-seed oil the crude mixture when combined with the rubber does not impair the insulating capacity of the latter to nearly such an extent as it otherwise would. It is in consequence of this that my product possesses the high electrical resistance which I claim for it.

The addition of the talc to the other ingredients is not absolutely necessary to the making of a good compound, but its use will be found to give such an increased adhesiveness to the crude material and to render the latter so much better adapted to combine with the india-rubber to produce the finished kerite that I strongly recommend its employment in all cases.

I do not confine myself to the precise proportions here given for the different ingredients of my crude kerite, as these may be varied within certain limits, so long as the results which I have arrived at are obtained. The temperatures and heating periods may also be somewhat altered, provided such changes do not impair the improved properties of the mixture; but the example of working which I have here given is the outcome of considerable practical experience in the manufacture of the material and will always be found to produce the best results.

The above-described special and specific crude-kerite compound constitutes the first of my improved kerite products, and my second improvement consists in producing a finished kerite by combining natural india-rubber with this specific compound, thereby imparting to the completed product the greatly-increased electrical resistance which has been referred to, while at the same time, as before stated, largely diminishing the cost of its manufacture. To effect this combination, I proceed as follows: The crude compound having been prepared in the manner herein set forth, I incorporate it with the natural india-rubber by grinding the two together in the rolls, employing such suitable proportions of the crude kerite and the rubber as may be best adapted to the purpose for which the finished product is to be used. For example, if the kerite is intended for the insulation of aerial wires or cables I use about one-fifth part of natural rubber to four-fifths of the crude compound. If the insulation is designed for underground conductors, about two-fifths parts of rubber to three-fifths of the compound should be employed, and if it is to be used for submarine cables then about three-fifths of rubber to about two-fifths of the crude kerite will be a suitable proportion. In the practical operation of combining the crude compound with the natural rubber in either of these mixtures I first grind all of the crude kerite which enters into the mixture till it comes to a warm homogeneous mass. Next I put into the rolls all the rubber, together with about ten pounds of litharge and about ten pounds of oxid of zinc, the litharge being used in the ordinary way to aid the subsequent vulcanization of the mass, and the oxid of zinc being also employed, as is customary, to render the finished product more solid and to prevent its oxidation. I also generally add to the rubber about six pounds of chicle or, preferably, the same quantity of what is called "Columbian gum," which is a substitute for chicle, but costs only about half as much and answers a better purpose, the effect being that the adhesive nature of these substances, whichever one be employed, causes the rubber and the other ingredients to combine very thoroughly. The rubber and these added materials are then ground together till they are well mixed, and as soon as this is effected the already-ground crude compound is put with the ground-rubber mixture and the combined mass is further ground until all the ingredients of it are thoroughly united together. The product is now ready for vulcanization, and to effect this I add to it a small quantity of sulfur—say about five pounds to each working batch of about seventy-five pounds of the combined materials; but before the vulcanization is performed and while the mixture is still plastic I proceed to spread it upon the wires which are to be used for the electrical conductors in the usual covering-machines. When the wires are fully covered, I vulcanize the kerite coating in the ordinary way, employing for the purpose a heat of about 260° to 280° Fahrenheit. This final vulcanization of the coating completes the work and converts the combination of the crude compound with the natural india-rubber into the finished kerite. An analogous operation is to be followed in all cases in which the finished kerite is to be employed for any of the other uses to which it may be adapted. No particular proportions of the crude compound and of the natural rubber need be specified for any of these other uses, as the proportions may be greatly varied and in each instance will depend upon the special purpose for which the product is designed; but the insulation of electrical wires and cables is the chief object to which the kerite has hitherto been applied, and for that reason this specification has been mainly limited to that matter.

It will be found that my improved finished kerite made with my special crude compound, as here described, will by actual test develop an electrical resistance at least twice as great as that of the Day product, while the omission of the cotton-seed oil from the crude compound will by largely reducing the expense of manufacturing that compound enable me to combine the natural rubber with a crude kerite costing fully forty per cent. less than it could be produced by Day. At the same time, as has been stated, all the valuable qualities of the Day compound remain unimpaired in my kerite. It withstands the effects of climate and of sunlight and of all the decomposing agencies of earth and sea. It is impervious to the action of ozone, and its high insulating capacity endures under all circumstances unaffected by rain or moisture, while the rubber, which imparts this capacity to it, is enabled by the union of the crude kerite with it to easily resist acids, alkalies, and all the hitherto-known rubber solvents.

Having thus made known my improvements, what I claim, and desire to secure by Letters Patent, is—

1. The within-described crude-kerite compound formed by mixing coal-tar, asphalt, linseed-oil and sulfur in the manner stated and vulcanizing the mixture, substantially as and for the purposes set forth.

2. The within-described crude-kerite compound formed by mixing coal-tar, asphalt, linseed-oil, talc and sulfur in the manner stated and vulcanizing the mixture, substantially as and for the purposes set forth.

3. The within-described kerite compound composed of the aforesaid crude kerite formed by the vulcanized mixture of coal-tar, asphalt, linseed-oil and sulfur in the manner stated, united with natural india-rubber, substantially as and for the purposes set forth.

4. The within-described kerite compound composed of the aforesaid crude kerite formed by the vulcanized mixture of coal-tar, asphalt, linseed-oil, talc and sulfur in the manner stated, united with natural india-rubber, substantially as and for the purposes set forth.

WILLIAM R. BRIXEY.

Witnesses:
H. G. MADDEN,
J. E. PALMER.